Aug. 19, 1958 E. M. RAMBERG 2,848,133
PRESSURE VESSELS AND METHODS OF MAKING SUCH VESSELS
Filed Oct. 28, 1954 3 Sheets-Sheet 1
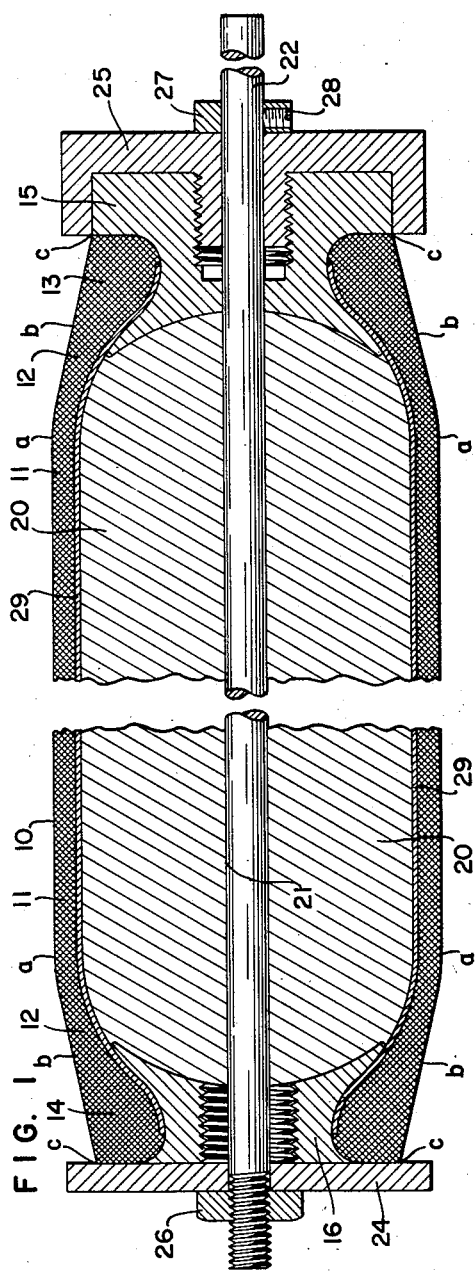
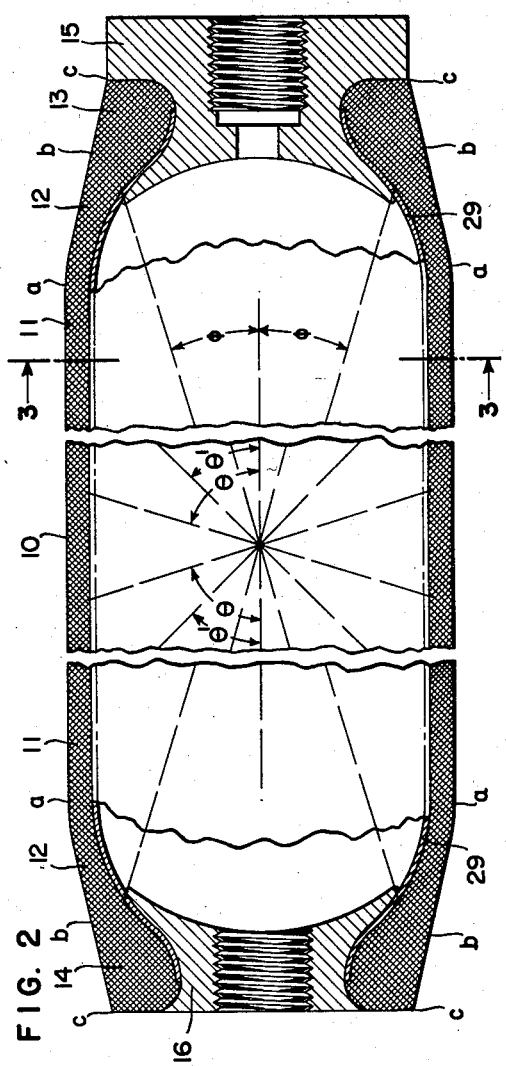
INVENTOR.
EINAR M. RAMBERG
BY
ATTORNEY.

Aug. 19, 1958     E. M. RAMBERG     2,848,133
PRESSURE VESSELS AND METHODS OF MAKING SUCH VESSELS
Filed Oct. 28, 1954     3 Sheets-Sheet 2

*INVENTOR.*
EINAR M. RAMBERG
BY
ATTORNEY.

INVENTOR.
EINAR M. RAMBERG

ATTORNEY.

United States Patent Office 2,848,133
Patented Aug. 19, 1958

2,848,133

PRESSURE VESSELS AND METHODS OF MAKING SUCH VESSELS

Einar M. Ramberg, Glen Head, N. Y.

Application October 28, 1954, Serial No. 465,407

2 Claims. (Cl. 220—3)

This invention relates to pressure vessels and to methods for making such vessels.

It is the principal object of the present invention to provide vessels for confining fluids under pressure as well as fluids at atmospheric pressures.

It is a further object of the present invention to provide relatively light yet sturdy pressure vessels.

It is a further object of the present invention to provide pressure vessels which are relatively inert, chemically, so as to eliminate substantially any likelihood of corrosion.

It is a further object of the present invention to provide pressure vessels having adequate thermal and electrical insulating properties and which will be non-sparking when struck.

It is a further object of the present invention to provide pressure vessels which are free from likelihood of fragmentation upon fracture or bursting.

It is a further object of the present invention to provide improved pressure vessels which are readily portable and thus particularly suitable for the storage and transportation of fluids, including liquids and/or gases, under pressure.

It is a further object of the present invention to provide vessels for confining fluids in which the vessels are non-magnetic.

It is a further object of the present invention to provide pressure vessels which may be readily given a permanent coloring or inserted label, or both, for purposes of identifying the contents.

It is a further object of the present invention to provide a pressure vessel fabricated of a non-homogeneous or composite material having as components reinforcements in predetermined directions and at a predetermined location and a binder for restraining the reinforcements.

It is a further object of the present invention to provide a pressure vessel fabricated of a non-homogeneous combination of reinforcements and a binder in which the reinforcements may be of light weight high strength fibrous material such as commercially available glass fiber yarns or rovings.

It is a further object of the present invention to provide a pressure vessel fabricated of a non-homogeneous or composite material having as components light weight high strength fibrous strand reinforcements and a binder, in which the reinforcements are disposed so that each fiber or strand will carry substantially equal loads.

It is a further object of the present invention to provide a pressure vessel fabricated of a non-homogeneous or composite material having as components light weight high strength strand reinforcements and a binder, in which the reinforcements are of continuous strands disposed in arrangements such that the optimum strength is provided for the reinforcements employed.

It is a further object of the present invention to provide a pressure vessel fabricated of a non-homogeneous or composite material having as components light weight high strength fibrous strand reinforcements and a binder, and in which a suitable corrosion resistant liner can be employed.

It is a further object of the present invention to provide improved methods of making pressure vessels having some or all of the characteristics aforesaid.

It is a further object of the present invention to provide a pressure vessel having a reinforced plastic wall and end fittings of metal or plastic in which the reinforcement is so applied that the end fittings become an integral part of the structure.

It is a further object of the present invention to provide relatively economical commercially practicable methods for producing pressure vessels.

Other objects and advantageous features of the present invention will be apparent from the specification and claims.

The nature and characteristic features of the invention will be more readily understood from the following description taken in connection with the accompanying drawings forming part hereof, in which:

Figure 1 is a longitudinal sectional view showing one form of vessel in accordance with the invention prior to the removal of the core and mandrel;

Fig. 2 is a longitudinal sectional view, similar to Fig. 1, showing the vessel in condition for the insertion of a valve and an end closure;

Figure 4:
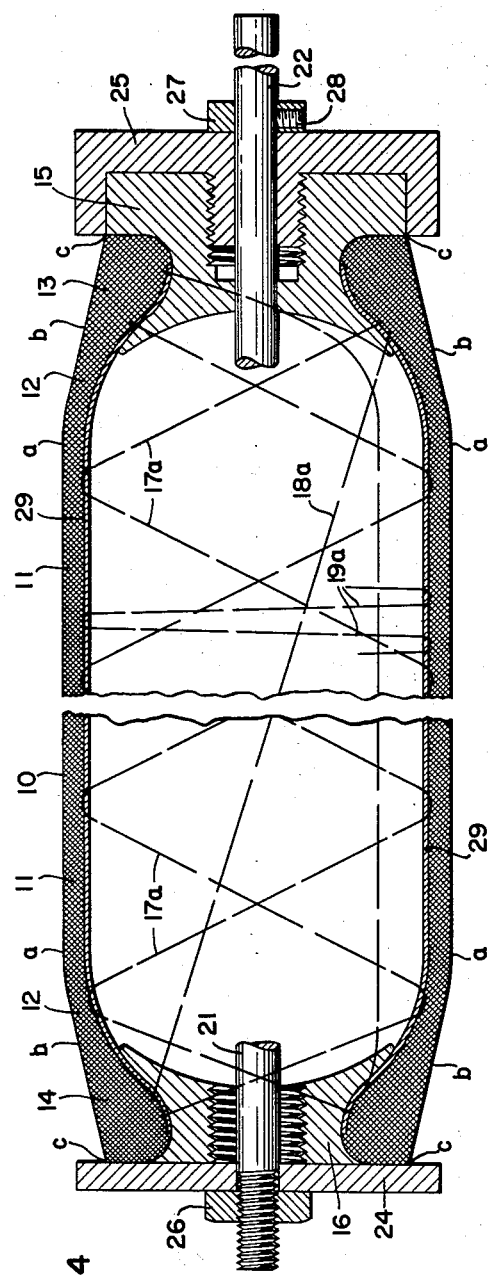
Fig. 4 is a diagrammatic view illustrating one mode of applying the strands of the reinforcement.
Figure 5:
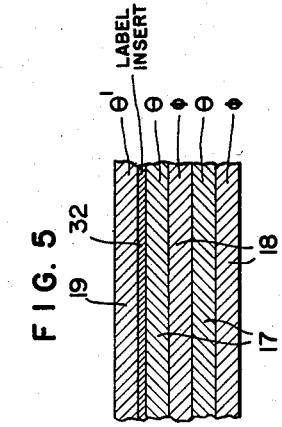
Fig. 5 is an enlarged fragmentary view taken approximately on the line 5—5 of Fig. 3.
Figure 3:
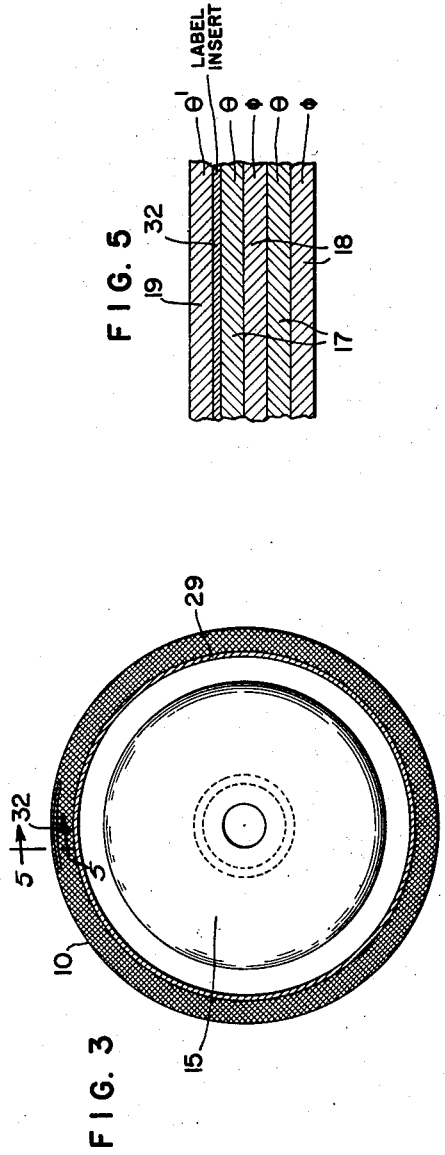
Fig. 3 is a transverse sectional view taken approximately on the line 3—3 of Fig. 2.
Figure 6:
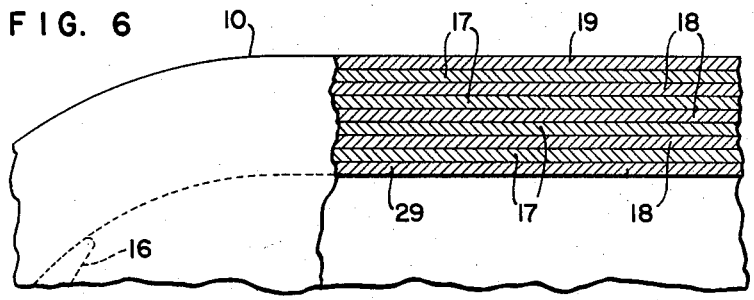
Fig. 6 is a fragmentary detail longitudinal sectional view of a portion of the construction shown in Figs. 1 to 4, inclusive, on an enlarged scale.
Figure 7:
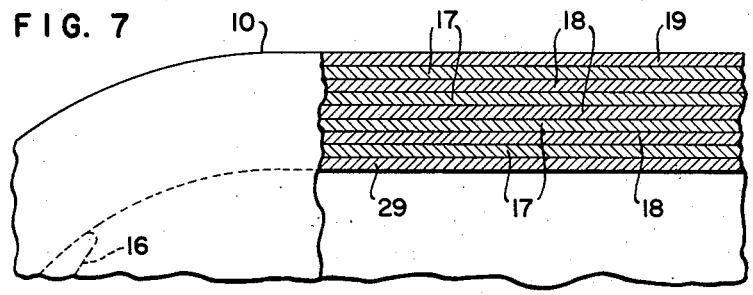
Figs. 7, 8 and 9 are views similar to Fig. 6 but showing modifications of the laminated structure.

It should, of course, be understood that the description and drawings herein are illustrative merely, and that various modifications and changes may be made in the structure and methods disclosed without departing from the spirit of the invention.

Like numerals refer to like parts throughout the several views.

The container of the present invention is preferably made of a plurality of layers of non-metallic fibers or strands of such fibers, disposed in a predetermined arrangement, impregnated with and bonded by a suitable plastic, preferably of the polymerizable thermosetting type such as polyester, phenol formaldehyde, or melamine formaldehyde resins or the like, or resins of the epoxide type. A variety of non-metallic fibers may be used in the construction of these containers, preferably of the high strength-low weight type, glass fiber yarns being particularly well adapted for this purpose. High strength synthetic fiber yarns of nylon, orlon and the like may be used for some purposes.

Glass fiber yarns or rovings and other similar yarns are commercially supplied in single or multiple strands, wound, twisted, spun or otherwise associated to form an integrated strand.

The use of a strand reinforcement and a binder, as hereinafter more fully set forth, results in a wall structure which is both non-homogeneous and non-isotropic, so that standard stress analysis techniques as used with conventional steel pressure vessels do not apply.

In the application of the reinforcement, winding is preferred so as to maintain substantially complete continuity of the strand, thus obviating the necessity for holding the ends of the strand within the body of the vessel or at the ends thereof while at the same time permitting the application of the strand in the desired disposition or arrangement.

By the use of added tension in the strands as they are applied, additional and improved effects can be obtained. The stressing of the strands permits obtaining a better control of the wall thickness and resin content and by prestressing the resin it permits higher tension in the reinforcement without failure of the bonding medium.

While reference is made herein to a strand, it should be understood that the application of the reinforcement is not limited to the application of only a single strand but that for purposes of speed in production a plurality of strands may be applied simultaneously in the same disposition or arrangement.

The pressure vessel of the present invention conforms to both theoretical and practical considerations for such a vessel fabricated of a non-homogeneous or composite reinforcing material and a binder for restraining such reinforcement in a predetermined location and direction.

It has heretofore been determined that the wall of a thin walled cylindrical vessel subjected to internal pressure is acted upon by two principal stresses occurring in the circumferential and axial directions and that the magnitude of the circumferential stress is twice that of the axial stress. Metals, such as steel, and other isotropic materials have equal strengths in all directions. The wall of a metallic cylinder must therefore be designed to withstand the larger circumferential stress. At failure, therefore, the axial stress will have reached only one half of the ultimate strength of the material.

The wall of the vessel of the present invention is built up of a plurality of different layers of fibers aligned in groups, but at differing angular arrangements, and the strength of each layer is, by reason of its particular disposition, highly oriented. The strength of each layer in the direction of the fibers is maximum, and for particular non-metallic fibers such as glass, may be equal to that of alloy steel. The strength of any layers perpendicular to the fiber direction is practically zero.

In its simplest theoretical form, the walls of a pressure vessel with strands as components could consist of two layers. One layer would contain fibers parallel to the cylinder axis and the other layer would contain circumferential fibers. If the fiber density were equal in both layers then the thickness of the layer containing circumferential fibers would be twice that of the other layer. Each fiber would then carry substantially the same load, and failure would result from the simultaneous breaking of both the circumferential and axial fibers. The wall would thus be used to its maximum capacity.

From this it will be seen that a strand reinforced plastic vessel cannot have a wall thickness which would be directly comparable to that of a vessel having a metal wall. If the parallel glass fiber laminate is considered as having the same strength as steel, then fibers must be applied circumferentially to a thickness equal to that of the wall of a steel vessel. While the steel would then have more than sufficient strength to withstand the axial load the fiber reinforced vessel requires an additional layer of axial reinforcement of a minimum of half the thickness of the layer of the circumferential reinforcements but increasing with an increase in the angle the reinforcement makes with the longitudinal axis. The total thickness required would thus be about fifty percent in excess of that required for a steel vessel. Since the specific weight of fiber reinforced plastic is only about one fourth of the specific weight of steel the total weight would be much less despite the thicker expected wall section.

In carrying through the actual operation of making a closed end vessel by winding, and using a continuous strand or strands of yarn or roving it is necessary to deviate from the directions parallel and perpendicular to the cylindrical axis because of the necessity of providing a central enclosed space, filled during the winding by a removable core, supporting the core from the exterior by a mandrel or shaft and providing one or more end inserts for access to the interior for removal of the core and for supporting valves, safety plugs and the like.

For purpose of illustration, a pressure vessel 10 is shown of substantially cylindrical conformation, with integral end closures to completely surround and contain a fluid under pressure. Such a vessel, as indicated in Fig. 2, has a center section 11 between the planes indicated by the lines $a$—$a$, a pair of transition regions 12, between the planes indicated by the lines $a$—$a$ and $b$—$b$, and end sections 13 and 14 between planes indicated by lines $b$—$b$ and $c$—$c$, with an internally threaded insert 15 in the end section 13 for the reception of a valve, closure, or the like, and with an internally threaded insert 16 in the end section 14 for the reception of a closure, fusible or pressure relief plug, or the like.

In its simplest form of a closed end pressure vessel, the wall would consist of two layers of helically wound fibers, preferably in strand rather than strip form for ease of handling, with the fibers subtending angles of + (plus) and − (minus) $\theta$ and of + (plus) and − (minus) $\theta$ with the cylinder axis as indicated in Fig. 2. A more complex pattern would consist of distributing the fibers in alternate pairs of layers containing fibers at $\pm\theta$ and $\pm\phi$, respectively. The optimum positioning of the fibers is determined by a number of factors, including the physical dimensions of the vessel, the size and shape of the end inserts 15 and 16, and by the limits imposed by the operation of the winding machine.

As previously indicated, each fiber should carry an equal share of the load. Since the fiber reinforcement and binder is a complex orthotropic material, elongations under load, rather than the stresses themselves are considered.

The maximum strain theory of failure states that a material will fail when the strain associated with its ultimate strength is exceeded, and has been determined to be applicable to a resin impregnated glass fiber structure. Each fiber in the vessel, regardless of orientation, should therefore be stretched the same amount and this will be accomplished if the strains in the wall are equal in all directions. The condition is likewise satisfied if the strains in the directions parallel and perpendicular to the cylinder axis are equal and if the wall is not deformed by shear strains.

Shear deformations are obviated by the symmetric construction of the vessel so that for each fiber subtending an angle of $+\theta$ with the cylinder axis there is provided a corresponding fiber at $-\theta$. The tendency of the fibers to rotate is neutralized so long as the shear strength of the binder is not exceeded.

In simplified form, and without resorting to the details and derivation of the equations expressing the relations between the variables of dimensions, it has been determined that by building up a wall thickness having layers of two kinds, i. e. at $\pm\theta$ and at $\pm\phi$, there are three variables, the two angles $\theta$ and $\phi$ and the ratio of the thickness of each kind of layer to the total wall thickness. For any values assigned to these angles, the relative thickness can be determined so that the condition of equal strain in all directions is satisfied. It is necessary, however, to bear in mind the requirement for an end fitting or end insert, such as 15 and 16, and a core about which fibers making a small angle $\phi$ with the longitudinal axis must be secured, and a mandrel or shaft for supporting and driving the core. At the same time, also, the angles $\theta$ and $\phi$ must also be chosen so that the shear stresses will not cause failure in the resinous bond between laminae until the ultimate tensile strength of the material has been exceeded.

A vessel thus designed will have equal strains at the center portion only. At the ends, the use of inserts 15 and 16 and the additional reinforcement required to anchor these inserts 15 and 16 restrain the circumferential expansion of the vessel under internal pressure.

The end sections 13 and 14 may each be considered as a non-deforming region or force inert plug. While the restraining effect of the end sections 13 and 14 decreases the hoop tension near the ends it simultaneously introduces axial bending stresses in transition regions 12. It has been found that $\phi$ should have some positive value greater than zero in order to reduce the flexural rigidity in the transition regions 12 and thereby reduce the bending stresses.

While it is possible to vary the angle $\theta$ from 55° to 90°, in applying the reinforcing fibers it has been found most suitable to employ substantially helical windings with a small pitch so as to keep the angle $\theta$ in the range between about 75° and 88°, as illustrated diagrammatically at 17a in Fig. 4, for a single traverse and return (or wrap) of a single yarn, wraps at $\pm \theta$ being indicated at 17.

The angle $\phi$ could be varied in the range from 0° to 55° but it has been found practicable to apply helical windings with the angle $\phi$ in the range from 10° to 25°, as also illustrated at 18a in Fig. 4, thus permitting accommodation of the end inserts 15 and 16, the wraps at $\pm \phi$ being indicated at 18.

The wraps lend themselves to machine winding techniques, and provide a secure anchorage for the fittings or end inserts 15 and 16.

Because the cosine of an angle close to 90° is above 0.900 the efficiency of such wraps will be close to 100%. Similarly, a reinforcement placed at an angle of 25° to the longitudinal axis will be equally effective since a component of its load carrying ability will be in the circumferential direction and the opposite component in the longitudinal direction.

The application of continuous fibers, preferably in continuous strand form with from one to eight or more strands being employed, in a side by side or in a tier arrangement, and distributed in a multiplicity of layers has been found preferable, with a plurality of layers of one angular disposition to provide a uniformly distributed reinforcement, followed, if desired, by a plurality of layers at another angular disposition. The strands for each particular angular disposition are thus preferably applied in interspersed groups, rather than first applying all the strands for one reinforcement and then all the strands for another, the particular sequence of applying the layers apparently not being critical.

While, from a theoretical approach, the windings just referred to meet the requirements it has been found advantageous to apply a final type of wrap 19, with strands 19a as illustrated in Fig. 4, an angle of $\theta'$ of $\pm 40°$ to 75°. This final wrap serves to compress and tie in the prior wraps, aid in the control of the resin content and provide a better finish on the exterior.

The final type of wrap may be applied in addition to the reinforcement called for by the actual structural requirements or may be employed as an interspersed wrap and calculated using three rather than two angles as variables and the ratio of two thicknesses to the total.

In applying the fibers, preferably in the form of strands the same are first treated, as may be necessary, to impregnate them with the desired resinous plastic, and the impregnated yarn, in a single or in a plurality of strands, is applied to a core 20. Any preferred type of core may be employed but preferably one which can be melted out at a temperature which will not damage the resin bond. The core 20 is shaped in accordance with the configuration desired in the finished container, with the inserts.

The core 20 is preferably prepared with a suitable central opening 21, to permit mounting of the core 20 on a mandrel 22. The preformed inserts 15 and 16, of metal or other desired material, are provided at the ends of the core 20 positioned on the mandrel 22. An exterior winding guide or pilot plate 24 and an end winding guide or pilot plate 25 are positioned on the mandrel 22, exterior to the inserts 15 and 16, for guiding and controlling the winding operation. A lock nut 26 and locking collar 27 with set screw 28 are preferably provided to hold the inserts 15 and 16 and plates 24 and 25 in their proper positions with respect to the core 20 during the winding.

The mandrel 22 is then positioned in a suitable rotating mechanism for rotating the core 20 and inserts 15 and 16 for the winding operations.

The impregnated yarn is then wound onto the core to form the vessel 10, and preparatory to winding may pass through a bath of resin so that the yarn is encompassed by as well as impregnated with the resin.

The resin carrying yarn is wound onto the rotating core 20 preferably at a predetermined selected helical or winding angle which may be either $\theta$ or $\phi$, starting at either end thereof, continuing helically to the other end, and then returning. At the ends of the core, the yarn is preferably carried around each of the inserts 15 and 16 to anchor the yarn at these locations so that slipping is minimized. The nature of the loop is dependent upon the specific angle $\phi$. If this angle is in a stable range so that the yarn is tangent to the small diameter a one quarter turn may suffice. The loop may be increased so as to be of the order of 400° to 900° as required to provide a proper end anchorage. This loop winding also provides continuity of the yarn and aids in redirecting the yarn travel for a subsequent application of the yarn on the core 20. The entrant angle of one layer is preferably the same as the leaving angle of the prior layer for a specific angular disposition of the strand to provide both the plus and minus value of the angles for symmetry. During the winding of a single pair of layers of resin impregnated yarn, a constant helical angle and either plus or minus, is preferably maintained in each direction.

Upon completion of a plurality of applications by traverse and return in the applying of the strands in this manner, and after sufficient yarn at the desired angular disposition has been applied so as to provide a uniformly distributed reinforcement, the helical angle may then be changed to the other angle, plus and minus, for the application of a plurality of layers at a different angular disposition.

A third winding at an angle $\pm \theta'$ may also be used, as previously indicated.

The plurality of layers of yarn at different helical angles is illustrated in Figs. 5 to 9, inclusive, although it should be understood that the layers of yarn or rovings are not intended to be limited to the number shown.

The presence and mobility of the polymerizable resin, superficially carried by the yarn from the resin chamber, facilitates in effecting a complete resin saturated layer of yarn or roving. As the winding progresses, the mobile resin flows in between the windings of yarn or rovings, filling the interstices thereof so that a subsequent integration of the yarn or rovings and resin can be effected. The flow of the resin proceeds radially and circumferentially, as well as longitudinally, as the winding progresses, so that there are no voids in the layers of yarn or rovings and plastic. Furthermore, the mobile resin ultimately bonds successive windings and successive pairs of layers of yarn or rovings together and bonds the yarns and their fibers to the end fittings to achieve an integration of the entire container. Layers of yarn or rovings are continuously applied and these may be in any desired arrangement, it not being considered essential that the specific angular windings be alternated. A plurality of windings at one helical angle may be followed by one or more at the other angle, so long as the desired total number of each is supplied.

For some applications and uses of the pressure vessel herein described it is desirable to employ a thin and flexible liner which is capable of withstanding the corrosive effects of the fluid to be placed in the pressure vessel, which has low permeability to the passage of gases, which has flexibility in relation to the more rigid reinforced wall, which has sufficient compressive strength to prevent squeezing of the liner under pressure, which has chemical inertness and resistance to elevated temperatures and which tends to decrease the porosity of the wall. Such a liner is shown in Figs. 1 to 4, 6 and 7, at 29, and may be of metal foil, synthetic plastic or other desired material having the requisite characteristics.

If a liner 29 is used it is preferably placed on the core 20 and in overlapping relation to the inserts 15 and 16 before the winding operations are commenced.

Figure 9:
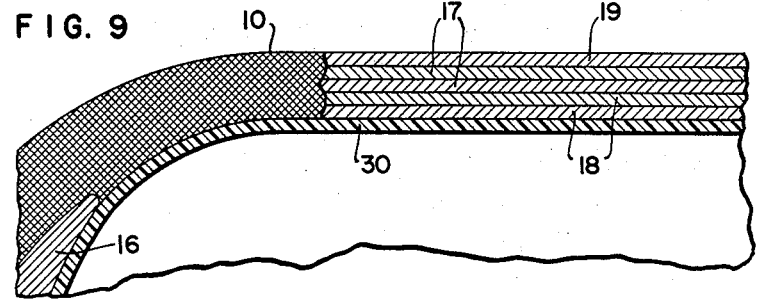

If desired, also, a synthetic plastic liner 30, interiorly disposed with respect to the inserts 15 and 16 may be employed, as shown in Fig. 9.

Figure 8:
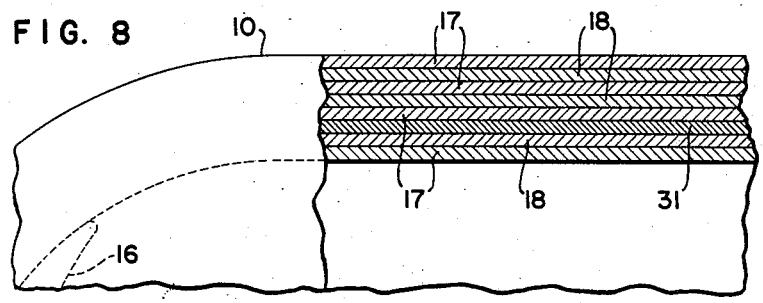

As shown in Fig. 8, if desired a lamination of thin, flexible metal foil 31 may be interposed between wraps 17 and 18, to resist the corrosive action of certain gases and liquids and to aid in reducing any tendency to porosity of the container wall.

Prior to the conclusion of the winding operation and with a comparatively few additional layers of yarn or rovings to be applied for completion, a label 32 of suitable material may be provided placed in contact with the outer surface and the final windings applied thereover. The label 32 may then be seen through the last few layers. Of course if desired, suitable coloring may be applied to the resin either continuously or for the last few layers to serve as an identification of the nature of the contents.

At the conclusion of the winding operation, a thin flexible relatively inert covering, such as cellophane, for certain kinds of resins such as polyesters, may be wound around the container to prevent air from reaching the resin during the curing process which follows. Air acts as a retardant and adversely affects the curing of some of the polymerizable resins and hence should be excluded and the presence of air voids would not permit of the proper distribution of the load as between the glass fiber yarns and the plastic. With other types of resins this covering is not necessary. The resin binder is then heat cured, or permitted to cure, in accordance with the characteristics of the particular type of resin and catalyst used.

After the completion of the cure, if a fusible core 20 is used, the temperature is increased until the core melts and can be poured out but the temperature is not raised to a point to injure the cured resin. If other types of cores 20 are used they are removed in a manner appropriate to the construction and composition.

After removal of the core 20, plugs, preferably of the non-magnetic type, are inserted at each end of the vessel 10 and in engagement with the inserts 15 and 16. The plugs may provide communication from the interior to the exterior of the vessel 10 and may comprise either a valve (not shown) or a terminal plug (not shown) as desired, and generally a valve on one end and a terminal plug on the other one are provided.

After the core 20 has been removed from the vessel 10 the covering, if used, is removed. If desired, the exterior of the vessel 10 may then be buffed or polished to any suitable finish.

The vessel 10 of the present invention, as above described, has been found to be satisfactory for the storage and transportation of fluids under pressure.

When the vessel 10 reaches the bursting point no fragmentation occurs. There is merely a break at the weakest point of the vessel 10 with the remainder being intact.

Reinforced pressure vessels made as heretofore described have been found to successfully resist repeated pressurization to various working pressures and the following are illustrations based on actual tests:

2⅜" O. D. x ⅛" reinforced wall x 14⅝" long—20,000 cycles 0–1850 p. s. i.
4" O. D. x 5/16" reinforced wall x 21¼" long—40,000 cycles 0–1850 p. s. i.
2½" O. D. x 3/16" reinforced wall x 14⅝" long—20,000 cycles 0–3000 p. s. i.
4⅛" O. D. x ⅜" reinforced wall x 21¼" long—20,000 cycles 0–3000 p. s. i.
5 11/32" O. D. x 17/64" reinforced wall x 27⅞" long— 30,000 cycles 0–2100 p. s. i.

The bursting pressure of vessels made in accordance with the invention can be predicted based on the amount of glass fiber included in the wrap. Where the wall thickness for a vessel has been calculated from the thin walled cylinder formula referred to above, and substituting in that formula the predicted ultimate burst pressure and a corresponding circumferential wall stress of 50,000 p. s. i., the actual results obtained follow closely the design figures and the following results were based on actual tests:

Burst pressure, p. s. i.
2⅜" O. D. by ⅛" reinforced wall by 14⅝" long__ 6000
4" O. D. by 5/16" reinforced wall by 21¼" long___ 7000
2½" O. D. by 3/16" reinforced wall by 14⅝" long__ 9500
4⅛" O. D. by ⅜" reinforced wall by 21¼" long__ 9700
1.93" O. D. x .07" reinforced wall by 10⅞" long__ 7000
5 11/32" O. D. by 17/64" reinforced wall by 27⅞" long__ 6800
8¾" O. D. by 9/16" reinforced wall by 59" long___ 9000

It is accordingly considered entirely feasible both on the basis of theoretical calculations and test results to use working pressure levels up to 4000 p. s. i., and higher, for pressure vessels as herein disclosed.

I claim:

1. A cylindrical container for fluids comprising a solid laminated assembly of non-metallic fibrous strands of threads including a plurality of types of superposed helical enclosing wrappings of said threads, one of said types of helical wrappings being at a predetermined angle to the longitudinal axis and another of said types of helical wrappings being at a different predetermined angle to the longitudinal axis, and a solidified bonding material impregnating said assembly and said threads, filling interstices between the fibers of said threads throughout said assembly and filling the interstices between said threads throughout said assembly and forming therewith a substantially integral structure, and a layer of metal foil interposed between two of said thread wrappings.

2. A cylindrical container for fluids comprising a solid laminated assembly of non-metallic fibrous strands of threads including a plurality of helical wrappings of said threads, one of said helical wrappings being at an angle to the longitudinal axis in the range from 0° to 55°, and another of said helical wrappings being at an angle to the longitudinal axis in the range from 55° to 90°, a solidified bonding material impregnating said assembly and said threads, filling interstices between the fibers of said threads throughout said assembly and filling the interstices between said threads throughout said assembly and forming therewith a substantially integral structure, and a layer of metal foil interposed between two of said thread wrappings.

References Cited in the file of this patent

UNITED STATES PATENTS

| | | |
|---|---|---|
| 1,957,554 | Rector | May 8, 1934 |
| 2,334,710 | Kouth | Nov. 23, 1943 |
| 2,594,693 | Smith | Apr. 29, 1952 |
| 2,596,970 | Adams | May 20, 1952 |
| 2,698,991 | Mesick | Jan. 11, 1955 |

FOREIGN PATENTS

| | | |
|---|---|---|
| 122,968 | Great Britain | Feb. 13, 1919 |